United States Patent
Oh et al.

(10) Patent No.: US 12,496,817 B2
(45) Date of Patent: Dec. 16, 2025

(54) COVER WINDOW AND APPARATUS AND METHOD FOR MANUFACTURING THE COVER WINDOW

(71) Applicant: Samsung Display Co., Ltd., Yongin-si (KR)

(72) Inventors: Jee-Seok Oh, Yongin-si (KR); Jeong-Ho Hwang, Yongin-si (KR); Sang-Gu Kim, Yongin-si (KR); Joo-Il Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/233,025

(22) Filed: Apr. 16, 2021

(65) Prior Publication Data

US 2021/0229412 A1 Jul. 29, 2021

Related U.S. Application Data

(62) Division of application No. 15/290,042, filed on Oct. 11, 2016, now Pat. No. 10,994,524, which is a
(Continued)

(30) Foreign Application Priority Data

Jun. 25, 2013 (KR) .......................... 10-2013-0073312

(51) Int. Cl.
*B32B 37/10* (2006.01)
*B32B 3/02* (2006.01)
(Continued)

(52) U.S. Cl.
CPC ................ *B32B 37/10* (2013.01); *B32B 3/02* (2013.01); *B32B 3/04* (2013.01); *B32B 3/28* (2013.01);
(Continued)

(58) Field of Classification Search
CPC .......... B32B 3/02; B32B 3/28; B32B 37/003; B32B 37/10; B32B 38/1866; B29C 65/42;
(Continued)

(56) References Cited

U.S. PATENT DOCUMENTS 9,498,938 B2 11/2016 Son et al.
10,194,538 B2 1/2019 Lee et al.
(Continued)

FOREIGN PATENT DOCUMENTS

KR        200388838 Y1 * 7/2005
KR   10-2012-0040783      4/2012
(Continued)

OTHER PUBLICATIONS

Non-Final Office Action of U.S. Appl. No. 14/057,536 dated Dec. 10, 2014.
(Continued)

*Primary Examiner* — George R Koch
(74) *Attorney, Agent, or Firm* — CANTOR COLBURN LLP (57) ABSTRACT

A cover window and an apparatus and method for manufacturing the cover window. The cover window includes a film layer having at least one bent portion, a resin layer having at least one bent portion, and an adhesive layer disposed between the film layer and the resin layer and adhering the film layer and the resin layer.

2 Claims, 4 Drawing Sheets

Related U.S. Application Data division of application No. 14/057,536, filed on Oct. 18, 2013, now Pat. No. 9,498,940.

(51) Int. Cl.

| | | |
|---|---|---|
| *B32B 3/04* | (2006.01) | |
| *B32B 3/28* | (2006.01) | |
| *B32B 7/12* | (2006.01) | |
| *B32B 27/08* | (2006.01) | |
| *B32B 27/30* | (2006.01) | |
| *B32B 27/36* | (2006.01) | |
| *B32B 37/00* | (2006.01) | |
| *B32B 38/18* | (2006.01) | |

(52) U.S. Cl.
CPC ............... *B32B 7/12* (2013.01); *B32B 27/08* (2013.01); *B32B 27/302* (2013.01); *B32B 27/308* (2013.01); *B32B 27/36* (2013.01); *B32B 27/365* (2013.01); *B32B 37/003* (2013.01); *B32B 37/0053* (2013.01); *B32B 38/1866* (2013.01); *B32B 2255/10* (2013.01); *B32B 2307/412* (2013.01); *B32B 2309/68* (2013.01); *B32B 2457/00* (2013.01); *Y10T 156/10* (2015.01); *Y10T 156/1744* (2015.01); *Y10T 428/24628* (2015.01)

(58) Field of Classification Search
CPC ............... B29C 65/48; Y10T 156/1744; Y10T 428/24628
IPC ......... B32B 3/02, 3/28, 37/003, 37/10, 38/1866; B29C 65/42, 65/48; Y10T 156/1744, 428/24628
See application file for complete search history.

(56) References Cited

U.S. PATENT DOCUMENTS

| | | | | |
|---|---|---|---|---|
| 2003/0173035 | A1 | 9/2003 | Yamaguchi | |
| 2004/0016506 | A1 | 1/2004 | Sakayori et al. | |
| 2004/0095546 | A1 | 5/2004 | Lee et al. | |
| 2007/0278951 | A1* | 12/2007 | Koo ..................... | B82Y 20/00 313/512 |
| 2009/0277578 | A1 | 11/2009 | Sung et al. | |
| 2009/0301748 | A1* | 12/2009 | Hsu ................... | B29C 45/14811 174/50 |
| 2010/0103138 | A1 | 4/2010 | Huang et al. | |
| 2012/0056340 | A1* | 3/2012 | Kitagawa ................ | B32B 41/00 264/1.34 |
| 2013/0000822 | A1* | 1/2013 | Kim ................... | B32B 17/10816 156/99 |
| 2013/0029084 | A1 | 1/2013 | Rhyu et al. | |
| 2013/0180653 | A1* | 7/2013 | Kim ..................... | G02F 1/1333 156/257 |
| 2013/0284351 | A1* | 10/2013 | Natarajan ......... | B32B 17/10889 156/212 |
| 2014/0002975 | A1 | 1/2014 | Lee et al. | |
| 2014/0096892 | A1 | 4/2014 | Cho et al. | |
| 2014/0299269 | A1 | 10/2014 | Son et al. | |

FOREIGN PATENT DOCUMENTS

| | | | |
|---|---|---|---|
| KR | 10-1206328 | 12/2012 | |
| KR | 10-2013-0007068 | 1/2013 | |
| KR | 10-2013-0013767 | 2/2013 | |
| KR | 10-1260297 | 5/2013 | |
| WO | 02-056352 | 7/2002 | |
| WO | WO-2012036389 A2 * | 3/2012 | ......... B32B 38/1866 |

OTHER PUBLICATIONS

Final Office Action of U.S. Appl. No. 14/057,536 dated Jun. 25, 2015.
Non-Final Action of U.S. Appl. No. 14/057,536 dated Oct. 8, 2015.
Final Office Action of U.S. Appl. No. 14/057,536 dated Apr. 4, 2016.
Notice of Allowance of U.S. Appl. No. 14/057,536 dated Jul. 20, 2016.
Office Action issued by Korean Patent Office on Sep. 11, 2019, in the examination of the Korean Patent Application No. 10-2013-0073312, which corresponds to U.S. Appl. No. 15/290,042.
Korean Grant of Patent dated Apr. 3, 2020, issued in Korean Patent Application No. 10-2013-0073312.
Non-Final Office Action mailed Aug. 28, 2018, in U.S. Appl. No. 15/290,042.
Final Office Action mailed Mar. 21, 2019, in U.S. Appl. No. 15/290,042.
Advisory Action mailed Jun. 3, 2019, in U.S. Appl. No. 15/290,042.
Non-Final Office Action mailed Jun. 27, 2019, in U.S. Appl. No. 15/290,042.
Advisory Action mailed Feb. 26, 2020, in U.S. Appl. No. 15/290,042.
Non-Final Office Action mailed Mar. 20, 2020, in U.S. Appl. No. 15/290,042.
Final Office Action mailed Sep. 24, 2020, in U.S. Appl. No. 15/290,042.
Advisory Action mailed Dec. 3, 2020, in U.S. Appl. No. 15/290,042.
Notice of Allowance mailed Apr. 6, 2021, in U.S. Appl. No. 15/290,042.
Burghoorn, M., et al.; "Single Layer Broadband Anti-Reflective Coatings for Plastic Substrates Produced by Full Wafer and Roll-to-Roll Step-and-Flash Nano-Imprint Lithography"; MDPI; Published: Aug. 27, 2013; 17 Pages. Materials 2013, 6(9), 3710-3726. URL: https://doi.org/10.3390/ma6093710.

* cited by examiner

COVER WINDOW AND APPARATUS AND METHOD FOR MANUFACTURING THE COVER WINDOW

CROSS-REFERENCE TO RELATED APPLICATION

This application is a Divisional of U.S. patent application Ser. No. 15/290,042, filed Oct. 11, 2016, now issued as U.S. Pat. No. 10,994,524, which is a Divisional of U.S. patent application Ser. No. 14/057,536 filed on Oct. 18, 2013, now issued as U.S. Pat. No. 9,498,940, and claims priority from and the benefit of Korean Patent Application No. 10-2013-0073312, filed on Jun. 25, 2013, which is hereby incorporated by reference for all purposes as if fully set forth herein.

BACKGROUND

Field

Exemplary embodiments of the present disclosure relate to a cover window and an apparatus and method for manufacturing the cover window.

Discussion of the Background

Recently, various mobile electronic devices are being widely used. Examples of mobile electronic devices include tablet personal computers (PCs) that have become widely popular in recent years, as well as small electronic devices such as mobile phones, smartphones, and the like.

Such mobile electronic devices include a display unit for providing visual information, such as images and video, to users so as to implement various functions the devices possess. When it comes to display units, components for driving a display unit have been downsized, and display units and their functions have been one of the most important features of the electronic devices. For example, display units that can be bent at a set angle have been manufactured.

In current technology, display units can be made flexible and bendable. Typically, a cover window may be attached to the outer surface of the display unit to protect the exterior of the display unit. The cover window may be formed of various materials. For example, the cover window may be formed of a glass material or a synthetic resin. The cover window may be injection-molded by using a synthetic resin material. However, when a cover window is manufactured by injection molding, it is prone to delamination or deformation, which can be often detected when the reliability thereof is examined.

SUMMARY

Exemplary embodiments of the present disclosure provide a cover window that can be easily manufactured and is rigid, and an apparatus and method for manufacturing the cover window.

According to one exemplary embodiment of the present invention, there is provided a cover window including: a film layer having at least one bent portion; a resin layer having at least one bent portion; and an adhesive layer interposed between the film layer and the resin layer and to attach the film layer and the resin layer to each other.

In accordance with one exemplary embodiment, there is provided an apparatus for manufacturing a cover window, comprising: a first moving unit configured to retain a first member comprising at least one bent portion; a second moving unit spaced apart from the first moving unit and configured to retain a second member; and a driving unit configured to linearly move at least one of the first moving unit and the second moving unit to laminate the first member and the second member, one of the first member and the second member comprising a resin layer, and the other comprising at least one of a film layer and a protection layer.

In accordance with one exemplary embodiment, there is provided a method of manufacturing a cover window, comprising: mounting on a first moving unit a first member comprising at least one bent portion; disposing at least a portion of a second member on a second moving unit so as to face the first moving unit; and laminating the first member and the second member by linearly moving at least one of the first moving unit and the second moving unit, wherein one of the first member and the second member comprises a resin layer, and the other one of the first member and the second member comprises at least one of a film layer and a protection layer.

It is to be understood that both the foregoing general description and the following detailed description are exemplary and explanatory and are intended to provide further explanation of the invention as claimed.

BRIEF DESCRIPTION OF THE DRAWINGS

The above and other features and aspects of the present invention will become more apparent by describing in detail exemplary embodiments thereof with reference to the attached drawings.

DETAILED DESCRIPTION OF THE ILLUSTRATED EMBODIMENTS

Embodiments of the present invention are described in detail herein with reference to the accompanying drawings so that this disclosure may be easily performed by one of ordinary skill in the art to which the present invention pertains. The present invention may, however, be embodied in different forms and should not be construed as being limited to the embodiments set forth herein. Rather, these embodiments are provided so that this disclosure will be thorough and complete, and will fully convey the scope of the present invention to those of ordinary skill in the art. Furthermore, the present invention is only defined by the scope of the claims. In the following description, technical terms are used only to explain a specific exemplary embodiment while not limiting the present invention. The terms in a singular form may include plural forms unless referred to the contrary. The terms "include", "comprise", "including", and "comprising" as used herein, specify a component, a process, an operation, and/or an element but do not exclude other components, processes, operations, and/or elements. It will be understood that although the terms "first" and "second" are used herein to describe various elements, these elements should not be limited by these terms. These terms are only used to distinguish one component from other components.

In the drawings, the thickness of layers, films, panels, regions, etc. may be exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present. Expressions such as "at least one of," when preceding a list of elements, modify the entire list of elements and do not modify the individual elements of the list. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 1:
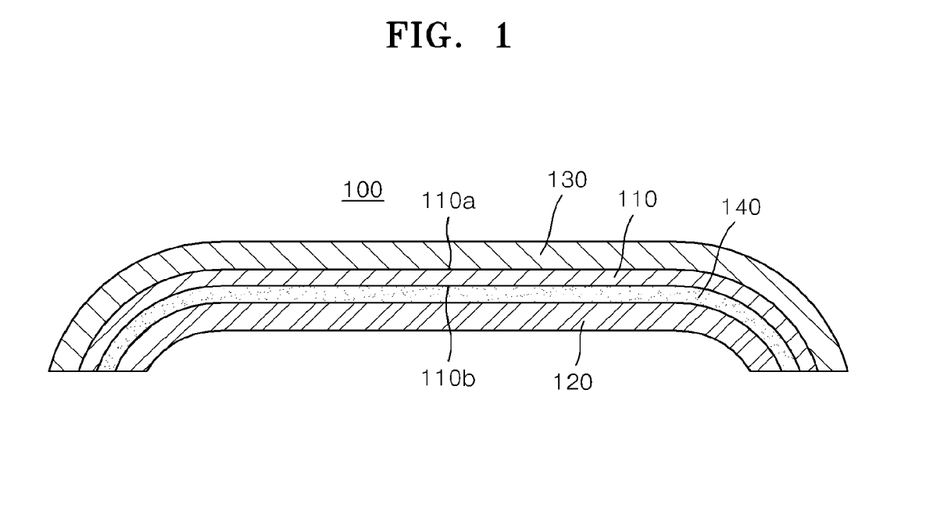
FIG. 1 is a cross-sectional view illustrating a cover window according to one exemplary embodiment of the present invention.
Figure 2:
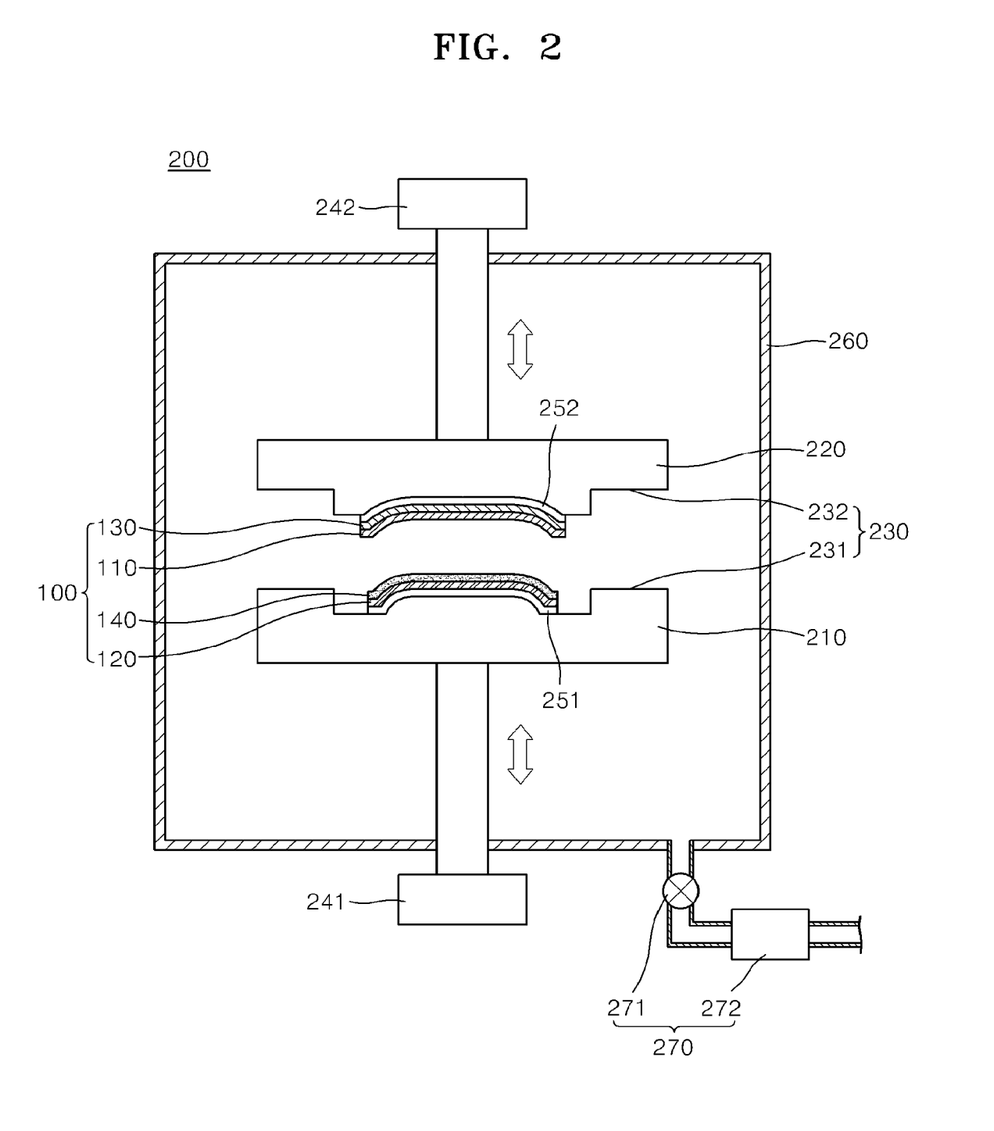
FIG. 2 is a cross-sectional view illustrating an apparatus for manufacturing the cover window illustrated in FIG. 1, according to one exemplary embodiment of the present invention.

FIG. 1 is a cross-sectional view illustrating a cover window 100 according to one exemplary embodiment of the present invention. FIG. 2 is a cross-sectional view illustrating an apparatus 200 for manufacturing the cover window 100 illustrated in FIG. 1, according to one exemplary embodiment of the present invention.

Referring to FIGS. 1 and 2, the cover window 100 may include a film layer 110. The film layer 110 may include a film body (not shown) and a shielding layer (not shown) disposed on at least one portion of the film body. The shielding layer may be provided to shield the film body from light coming from the outside. Hereinafter, for ease of description, the description will focus on an exemplary embodiment in which a shielding layer is not formed on the film body of the film layer 110.

In accordance with one exemplary embodiment, the film layer 110 may have at least one bent portion. The film layer 110 may be bent in various forms. For example, the film layer 110 may have a curved surface with a set radius of curvature. The film layer 110 may have only one bent portion. For example, the film layer 110 may have a flat shape, except edges thereof. That is, only the edges of the film layer 110 may be bent. Here, both side edges of the film layer 110 may be bent. Alternatively, only one side edge of the film layer 110 may be bent.

Furthermore, the film layer 110 may have a plurality of curved surfaces having different radii of curvature. More specifically, the film layer 110 may have first to N-th curved surfaces having first to N-th radii of curvature (where N is a natural number). In accordance with one exemplary embodiment, the first to N-th curved surfaces may be connected to each other.

However, the film layer 110 is not limited to the above described forms. As long as at least one portion of the film layer 110 is bent, the film layer 110 may have any form.

Also, the bent portion of the film layer 110 may be a portion that is bent in at least one of a length direction and a width direction. More specifically, the film layer 110 may be bent in the length or width direction. Alternatively, the film layer 110 may be bent in both length and width directions.

Hereinafter, for ease of description, exemplary embodiments where only edge portions of the film layer 110 are bent will be described in detail. In addition, for ease of description, the film layer 110 of which both side edges are bent in the width direction will be described in detail.

The film layer 110 may be bent in various directions. For example, the film layer 110 may have an upwardly convex shape as seen in FIG. 1. Alternatively, the film layer 110 may have a downwardly convex shape. However, hereinafter, for ease of description, the film layer 110 having the upwardly convex shape, as shown in FIG. 1, will be described in detail.

In accordance with one exemplary embodiment, the film layer 110 may be formed of a transparent material. For example, the film layer 110 may be formed of at least one of polymethylmethacrylate (PMMA), polycarbonate (PC), polyethylene terephthalate (PET), polyethylene terephthalate glycol (PETG), and acrylonitrile butadiene styrene (ABS). The material may be provided as a resin to form the film layer 110. The film layer 110 is not limited to the above-described materials and may include any injection-moldable transparent materials.

The shielding layer formed on the film body may be manufactured by an inkjet printing method, a silk screen printing method, an imprint method, or the like. Since the inkjet printing method, the silk screen printing method, the imprint method, and the like can be employed in a conventional manner, detailed descriptions thereof will be omitted. The method of manufacturing the shielding layer is not limited to the above-described methods. For example, the method may include any methods of forming an opaque layer on the film body.

As described above, the shielding layer may be disposed on at least one portion of the film layer 110. In particular, the shielding layer may be disposed on the edge of the film layer 110.

In accordance with one exemplary embodiment, the cover window 100 may include a resin layer 120 having at least one bent portion. The resin layer 120 may have substantially the same shape as that of the film layer 110. In detail, if at least one portion of the film layer 110 is bent, at least one portion of the resin layer 120 may also be correspondingly bent conforming to the film layer 110. The curved surface of the film layer 110 may have a radius of curvature that is similar to that of the resin layer 120.

In accordance with one exemplary embodiment, the resin layer 120 may be formed of a transparent material. For example, the resin layer 120 may include at least one of polymethylmethacrylate (PMMA), polycarbonate (PC), polyethylene terephthalate (PET), polyethylene terephthalate glycol (PETG), and acrylonitrile butadiene styrene (ABS). Here, the material may be provided as a resin and subsequently injected to form the resin layer 120. Also, the resin layer 120 is not limited to the above-described materials and may include any injection-moldable transparent materials. The resin layer 120 and the film layer 110 may be formed of different materials or the same material.

The cover window 100 may include an adhesive layer 140 that is interposed between the film layer 110 and the resin layer 120 and attaches the film layer 110 to the resin layer 120. The adhesive layer 140 may include an optical clear adhesive (OCA). However, the adhesive layer 140 is not limited thereto, and may include any material that is interposed between the film layer 110 and the resin layer 120 and attaches the film layer 110 to the resin layer 120.

At least two of the film layer 110, the adhesive layer 140, and the resin layer 120 may have different sizes. More specifically, the film layer 110 and the adhesive layer 140 may have different sizes. Also, the film layer 110 and the resin layer 120 may have different sizes. The adhesive layer 140 and the resin layer 120 may have different sizes. Also, the film layer 110, the adhesive layer 140, and the resin layer 120 may all have different sizes. In particular, the film layer 110, the adhesive layer 140, and the resin layer 120 may have sizes that reduce in that order. Accordingly, when the film layer 110, the adhesive layer 140, and the resin layer 120 are assembled, the corresponding edges of the film layer 110, the adhesive layer 140, and the resin layer 120 may fit with one another.

The cover window 100 may include a protection layer 130 formed on the film layer 110. The protection layer 130 may be formed on the film layer 110 to oppose the resin layer 120 (i.e., to be disposed on the opposite side of the cover window 100). More specifically, when the adhesive layer 140 is formed on a first external surface 110a of the film layer 110, the protection layer 130 may be formed on a second external surface 110b of the film layer 110 that is different from the first external surface 110a. On the other hand, as shown in FIG. 1, when the adhesive layer 140 is formed on the second external surface 110b, the protection layer 130 may be formed on the first external surface 110a. However, for ease of description, the description made below will focus on an exemplary embodiment in which the protection layer 130 is formed on the first external surface 110a, and the adhesive layer 140 is formed on the second external surface 110b.

The protection layer 130 may be formed of a material having functions such as protecting the underlying object from an external force, foreign substances, and static electricity. More specifically, the protection layer 130 may be formed of an acrylic material. Also, the protection layer 130 may be formed of a complex layer including an organic material and an inorganic material. The protection layer 130 may be formed as a film and attached on the film layer 110, and may also be formed using a coating method. However, for ease of description, the description below will focus on an exemplary embodiment in which the protection layer 130 is formed as a film and attached on the film layer 110.

Accordingly, as the cover window 100 may have various forms, the cover window 100 may be used with a flexible display panel to manufacture various electronic devices. Moreover, although the cover window 100 maintains a bent form, the film layer 110 and the resin layer 120 will hardly be separated because the film layer 110 and the resin layer 120 are attached to each other by the adhesive layer 140.

Referring to FIG. 2, the apparatus 200 for manufacturing the cover window 100 as described above may include a first moving unit 210 in which a first member (not shown) is disposed, and at least a portion of the first member is bent. Also, the apparatus 200 may include a second moving unit 220 that is spaced apart from the first moving unit 210 and in contact with a portion of a second member (not shown). The first moving unit 210 may include a first jig (not shown), and the second moving unit 220 may include a second jig (not shown). More specifically, the second jig may be disposed to face the first jig.

A portion of the first moving unit 210 and a portion of the second moving unit 220 may be formed in substantially the same form as at least one of the first member and the second member, respectively. For example, when the first member is bent, a recess may be formed in the first moving unit 210 or a portion of the first moving unit 210 may protrude so that the first moving unit 210 may completely contact the external surface of the first member. Moreover, a portion of the second moving unit 220 may protrude or a recess may be formed in the second moving unit 220 such that second moving unit 220 has a similar shape to the first moving unit 210 having a recess or a protrusion. However, for ease of description, the description below will focus on an exemplary embodiment in which a portion of the first moving unit 210 protrudes, and a recess is formed in the second moving unit 220.

In accordance with one exemplary embodiment, at least one of the first moving unit 210 and the second moving unit 220 may include an aligning unit 230. The aligning unit 230 may include an align pin 231 that is formed on one of the first moving unit 210 and the second moving unit 220 and an align groove 232 that is formed on the other one of the first moving unit 210 and the second moving unit 220, and the align pin 231 is inserted into the align groove 232. However, the aligning unit 230 is not limited thereto, and may be any structure or device that aligns the first moving unit 210 with the second moving unit 220 when at least one of the first moving unit 210 and the second moving unit 220 moves, such as in a linear direction.

In accordance with one exemplary embodiment, the apparatus 200 for manufacturing a cover window may include a driving unit (for example, first and second driving units 241 and 242) which allows at least one of the first moving unit 210 and the second moving unit 220 to move, such as in a linear direction, so as to laminate the first and second members. Further, in accordance with one exemplary embodiment, one of the first and second members may include the resin layer 120, and the other one of the first and second members may include at least one of the film layer 110 and the protection layer 130. However, for ease of description, the description below will focus on an exemplary embodiment in which the first member include the resin layer 120, and the second member include the film layer 110 and the protection layer 130.

The driving unit may have various forms. For example, the driving unit may include a cylinder (not shown), a motor (not shown), and a gear unit (not shown). However, for ease of description, the description below will focus on an exemplary embodiment in which the driving unit includes a cylinder.

The driving unit may include at least one of a first driving unit 241 that is connected to the first moving unit 210 to linearly move the first moving unit 210 and a second driving unit 242 that is connected to the second moving unit 220 to linearly move the second moving unit 220. However, for ease of description, the description below will focus on an exemplary embodiment in which both the first and second driving units 241 and 242 are included.

The apparatus 200 for manufacturing a cover window may include a first fixing unit 251 that is installed on the first moving unit 210 to fix the resin layer 120. Also, the apparatus 200 may include a second fixing unit 252 that is installed on the second moving unit 220 to fix the film layer 110 and the protection layer 130.

The first fixing unit 251 and the second fixing unit 252 may have a similar form. More specifically, the first fixing unit 251 may include a first vacuum hole (not shown) that is formed to pass through the first moving unit 210 and a first pump (not shown) that is connected to the first vacuum hole to absorb the air through the first vacuum hole. Also, the first fixing unit 251 may include a first adhesion chuck (not shown) that is installed on an external surface of the first moving unit 210. The first adhesion chuck may include at least one of a first adhesive film (not shown) and a first urethane sheet (not shown). More specifically, protrusions may be formed on at least one of the first adhesive film and the first urethane sheet so as to increase its adhesive force.

Like the first fixing unit 251, the second fixing unit 252 may include a second vacuum hole (not shown) that is formed to pass through the second moving unit 220 and a second pump (not shown) that is connected to the second vacuum hole. Also, the second fixing unit 252 may include a second adhesion chuck (not shown), and the second adhesion chuck may include at least one of a second adhesive film (not shown) and a second urethane sheet (not shown). Protrusions may be formed on at least one of the second adhesive film and the second urethane sheet to increase its adhesive force.

Hereinafter, for ease of description, the description below will focus on an exemplary embodiment in which the first and second fixing units 251 and 252 include the first and second adhesion chucks, respectively.

According to a method of manufacturing the cover window 100 as described above, the film layer 110 formed of at least one of the materials as described above may be formed. If the film body and the shielding layer are to be formed, the film body may be formed first, and the shielding layer may be formed on at least a portion of the film body, for instance, by using an inkjet printing method, a silk screen method, or an imprinting method. Because the inkjet printing method, the silk screen method, or the imprinting method may be employed in a conventional manner, the detailed description thereof is omitted.

When the above-described operation is completed, the protection layer 130 may be formed on the film layer 110. As described above, the protection layer 130 may be formed as a film and attached on the film layer 110. Instead of a film, the protection layer 130 may also be formed using a coating method as described above. More specifically, the protection layer 130 may be formed of an acrylic material or by alternately stacking an organic material and an inorganic material described above by using a spray method or a dip-coating method. Because the spray method or the dip-coating method can be employed in a conventional manner, the description thereof is omitted.

The protection layer 130 formed as described above according to one exemplary embodiment can protect the external surface of the film layer 110 from an external force, foreign substances, static electricity, or the like.

When the above-described operation is completed, the film layer 110, on which the protection layer 130 is formed, may be disposed on the second moving unit 220. The film layer 110, on which the protection layer 130 is formed, may be disposed in a flat state or may be bent and then disposed on the second moving unit 220. More specifically, when the film layer 110 is disposed on the second moving unit 220 in a flat state, two edges of the protection layer 130 may contact the second moving unit 220, and the central portion of the protection layer 130 may be separated from the surface of the second moving unit 220. On the other hand, when the film layer 110 is bent, two edges and the central portion of the protection layer 130 may completely contact the surface of the second moving unit 220.

However, for ease of description, the description below will focus on an exemplary embodiment in which the film layer 110 in bent form is disposed on the second moving unit 220.

The film layer 110 may be bent in various manners; the film layer 110 may be bent by compressing or pressing the same by using a jig. After bending the film layer 110 as described above and disposing the same on the second moving unit 220, the protection layer 130 may be fixed by using the second fixing unit 252.

In accordance with one exemplary embodiment, the resin layer 120 may be formed prior to, during, or subsequent to the above-described procedure of preparing the film layer 110. More specifically, the resin layer 120 may be manufactured by injecting a resin. More specifically, a resin may be injected at a temperature in a range from 200° C. to 300° C. Also, the resin may be injected into a mold having a bent form so that the resin layer 120 has a bent form.

The resin may be at least one of PMMA, PMMA, PC, PET, PETG, and ABS, which the resin layer 120 is formed of.

When the above-described operation is completed, the temperature may be reduced to harden the resin, thereby forming the resin layer 120. When the above operation is completed, at least a portion of the resin layer 120 may be bent.

The resin layer 120 that is bent as described above may be mounted on the first moving unit 210. In accordance with one exemplary embodiment, a portion of the first moving unit 210 may be shaped to protrude, conforming to the bent external surface of the resin layer 120, and support the resin layer 120. Also, the first fixing unit 251 may fix the resin layer 120.

In accordance with one exemplary embodiment of the present invention, the adhesive layer 140 may be coated on the resin layer 120. The adhesive layer 140 may be formed as a film like the film layer 110 described above and may be attached on the external surface of the resin layer 120. Here, the resin layer 120 coated with the adhesive layer 140 may be disposed on the first moving unit 210, or after the resin layer 120 is disposed on the first moving unit 210, the adhesive layer 140 may be coated. However, for ease of description, the description below will focus on an exemplary embodiment in which the adhesive layer 140 is coated on the resin layer 120 after the resin layer 120 being disposed on the first moving unit 210.

When the adhesive layer 140 is completely coated, at least one of the first moving unit 210 and the second moving unit 220 is linearly moved to compress the resin layer 120 and the film layer 110, thereby laminating the resin layer 120 and the film layer 110. More specifically, when the first driving unit 241 and the second driving unit 242 operate, the first moving unit 210 and the second moving unit 220 may approach each other. Then, the first adhesive layer 140 on the resin layer 120 and the film layer 110 may contact each other, and the adhesive layer 140 and the film layer 110 may be attached to each other according to the movement of the first moving unit 210 and the second moving unit 220. In particular, in the above-described embodiment of the present invention, the first driving unit 241 and the second driving unit 242 may operate according to the appropriately set operating time, speed, and pressure.

When the above-described operation is completed, the first driving unit 241 and the second driving unit 242 operate again to separate the first moving unit 210 and the second moving unit 220 from each other. The film layer 110 and the resin layer 120 are attached by the operation of the first and second moving units 210, 220, and may remain attached while the first moving unit 210 or the second moving unit 220 is moving.

When the operation of the first and second driving units 241 and 242 is completed, an operator may remove the protection layer 130, the film layer 110, the adhesive layer 140, and the resin layer 120, which are formed as a single body, from the first moving unit 210 or the second moving unit 220 to obtain the manufactured cover window 100.

The operator may take out the layers on his or her own or by using a robot arm included in the apparatus 200 for manufacturing a cover window. Also, the apparatus 200 may include a chamber 260 that can create vacuum inside when manufacturing the cover window 100. Moreover, the apparatus 200 may include a pressure adjusting unit 270 that is connected to the chamber 260 and adjusts the inner pressure of the chamber 260. The pressure adjusting unit 270 may include a flow duct 271 and a vacuum pump 272 connected to the flow duct 271. If the cover window 100 is manufactured in a vacuum chamber, fewer bubbles may be generated when the film layer 110 and the resin layer 120 are laminated.

As such, by using the apparatus 200 for manufacturing a cover window and the method of manufacturing a cover window as described above, the cover window 100 may be manufactured at room temperature, and thus deformation of the film layer 110 may be prevented. Also, by using the apparatus 200 for manufacturing a cover window and the method of manufacturing a cover window, as the resin layer 120 having a small thickness is manufactured in advance and laminated, the thickness of the cover window 100 may be easily adjusted.

Figure 3:
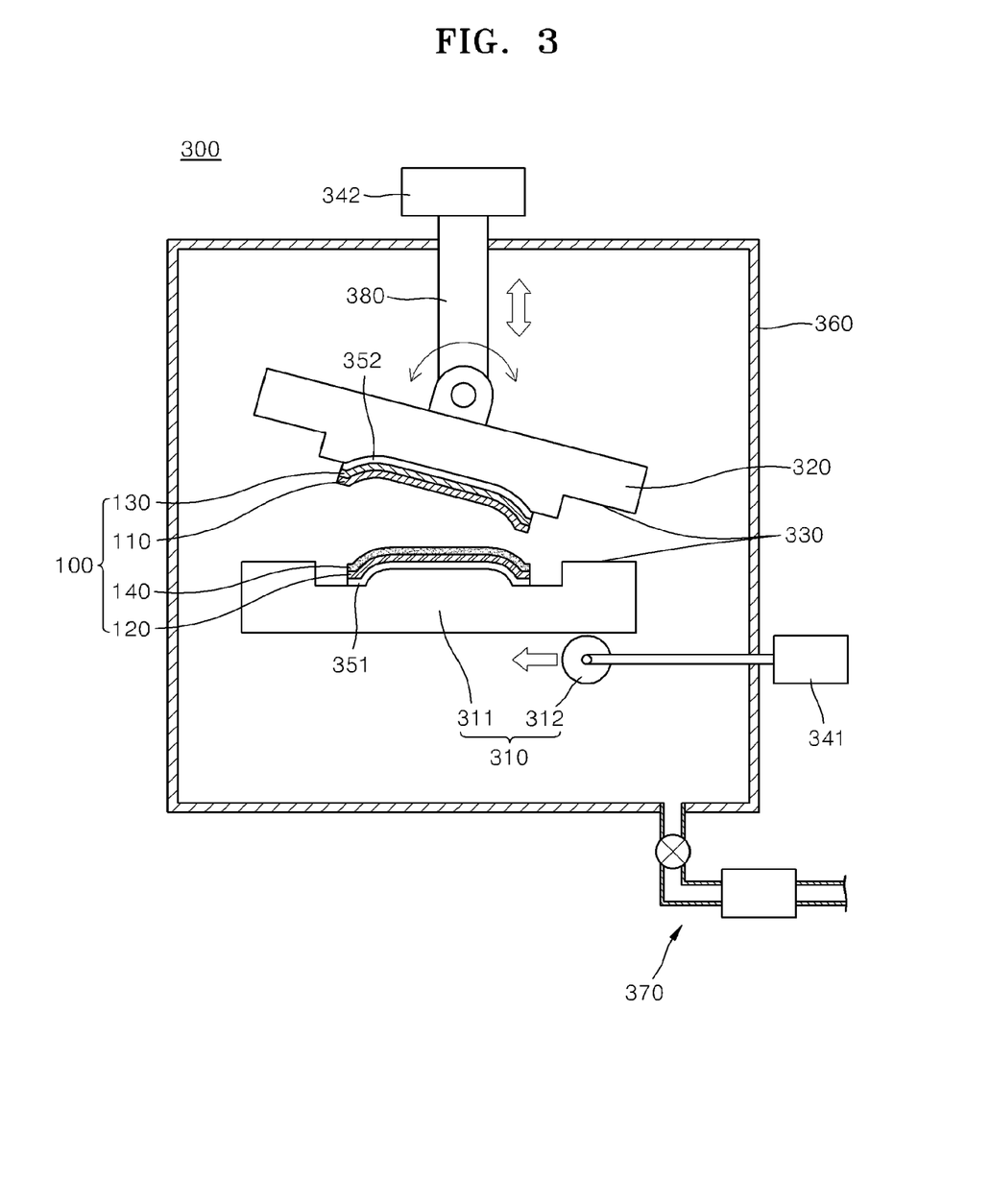
FIG. 3 is a cross-sectional view illustrating an apparatus for manufacturing the cover window illustrated in FIG. 1, according to one exemplary embodiment of the present invention.

FIG. 3 is a cross-sectional view illustrating an apparatus 300 for manufacturing the cover window 100 illustrated in FIG. 1 according to another embodiment of the present invention. Hereinafter, like reference numerals as described above denote like elements.

Referring to FIG. 3, the apparatus 300 for manufacturing a cover window may include a first moving unit 310, a second moving unit 320, a first fixing unit 351, a second fixing unit 352, a first driving unit 341, a second driving unit 342, an aligning unit 330, a chamber 360, and a pressure adjusting unit 370. The second moving unit 320, the first fixing unit 351, the second fixing unit 352, the second driving unit 342, the aligning unit 330, the chamber 360, and the pressure adjusting unit 370 are substantially the same as the second moving unit 220, the first fixing unit 251, the second driving unit 242, the aligning unit 230, the chamber 260, and the pressure adjusting unit 270, respectively, and thus detailed descriptions thereof are not repeated.

The first moving unit 310 may include a first jig 311 and a driving roller 312 that contacts the first jig 311 and makes a linear movement along an external surface of the first jig 311. The driving roller 312 may make a linear movement in a width direction or a length direction of the film layer 110.

Also, the first driving unit 341 may be connected to at least one of the first jig 311 and the driving roller 312 so that at least one of the first jig 311 and the driving roller 312 makes a linear movement. In accordance with one exemplary embodiment, the first driving unit 341 may include a cylinder that is connected to at least one of the first jig 311 and the driving roller 312. More specifically, the first driving unit 341 may include a plurality of rollers that rotate the driving roller 312 while being in contact with the driving roller 312, and a motor and a gear assembly that are connected to the plurality of rollers and linearly move the plurality of rollers while rotating the plurality of rollers. However, for ease of description, the description below will focus on an exemplary embodiment in which the first driving unit 341 includes a cylinder, and the first driving unit 341 linearly moves only the driving roller 312.

The apparatus 300 for manufacturing a cover window may include a shaft 380 that is connected to the second driving unit 342 and the second moving unit 320. The shaft 380 may be provided to make the second moving unit 320 rotatable. The first jig 311 and the second moving unit 320 may be disposed at a predetermined angle. More specifically, the second moving unit 320 may be inclined with respect to the first jig 311. For instance, the second moving unit 320 may be rotated such that the second moving unit 320 forms an angle (e.g., acute, obtuse, and right) with the first jig 311. The shaft 380 may be configured to not only control the angle formed between the second moving unit 320 and the first jig 311, but also control the distance between them by moving the second moving unit 320 toward or away from the first jig 311. Further, in one exemplary embodiment of the present invention, the second moving unit 320 may include a second jig (not labeled).

In accordance with one exemplary embodiment using the apparatus 300 for manufacturing a cover window as described above, the film layer 110 may be formed, and then the protection layer 130 may be formed on the film layer 110. The method of forming the protection layer 130 on the film layer 110 is substantially the same as described above, and thus a detailed description thereof is not repeated. In addition, as described above, the film layer 110 may be disposed on the second moving unit 320 in a flat state or in a bent state. The method of fixing the film layer 110 to the second moving unit 320 is substantially the same as described above, and thus a detailed description thereof is omitted. In addition, for ease of description, the description below will focus on an exemplary embodiment in which the film layer 110 in bent form is disposed on the second moving unit 320.

While the above-described operation is performed, the resin layer 120 may be formed and disposed on the first jig 311. The method of forming and disposing the resin layer on the first jig 311 is substantially the same as described above, and thus a detailed description thereof is omitted. More specifically, when the resin layer 120 is disposed on the first jig 311, the adhesive layer 140 may be coated on the resin layer 120. The method of coating the adhesive layer 140 and an order of operations of the method are substantially the same as described above, and thus a detailed description thereof is omitted.

When the resin layer 120 and the film layer 110 are disposed as described above, the second driving unit 342 may be operated so that the first jig 311 and the second moving unit 320 approach each other. When the film layer 110 and the adhesive layer 140 contact each other, the first driving unit 341 may linearly move the driving roller 312 along an external surface of the first jig 311.

More specifically, when the film layer 110 and the adhesive layer 140 contact each other, the driving roller 312 may linearly move from a portion of the first jig 311 where the distance between the first jig 311 and the second moving unit 320 is a first distance to another portion of the first jig 311 where the distance between the first jig 311 and the second moving unit 320 is a second distance. In accordance with one exemplary embodiment, the first distance may be smaller than the second distance. Further, the first distance may be equal to the sum of the thicknesses of the protection layer 130, the film layer 110, the adhesive layer 140, and the resin layer 120.

When the driving roller 312 operates as described above, the second moving unit 320 may continuously move. The driving roller 312 may move in connection with the movement of the second moving unit 320, while the second moving unit 320 may move according to the position of the driving roller 312.

When the driving roller 312 operates as described above, and the adhesive layer 140 and the film layer 110 start to contact each other, the adhesive layer 140 and the film layer 110 may be laminated continuously as the driving roller 312 linearly moves from the first end to the second end of the resin layer 120. More specifically, in the above-described embodiment of the present invention, the adhesive layer 140 and the film layer 110 are made attached continuously from the first end to the second end of the resin layer 120, and thus fewer bubbles are generated between the adhesive layer 140 and the film layer 110. Moreover, when the chamber 360 is maintained in a vacuum by using the pressure adjusting unit 370, even fewer bubbles are generated between the adhesive layer 140 and the film layer 110.

When the above-described operation is completed, the first jig 311 and the second moving unit 320 are separated from each other to thereby separate the protection layer 130, the film layer 110, the adhesive layer 140, and the resin layer 120 from the first jig 311 or the second moving unit 320. The method of separating the layers is substantially the same as described above, and thus a detailed description thereof is omitted.

By using the apparatus 300 for manufacturing a cover window and the method of manufacturing a cover window according to one exemplary embodiment, the film layer 110 and the resin layer 120 may be laminated quickly and easily, and also bubbles tend to be generated less often during the lamination of the film layer 110 and the resin layer 120, thereby remarkably reducing defects in the manufactured cover window 100.

In addition, using the apparatus 300 for manufacturing a cover window and the method of manufacturing a cover window according to one exemplary embodiment, the film layer 110 and the resin layer 120 may be more rigidly coupled to each other, not only by compressing the first moving unit 310 and the second moving unit 320 but also by the driving roller 312 pressing the first moving unit 310.

Figure 4:
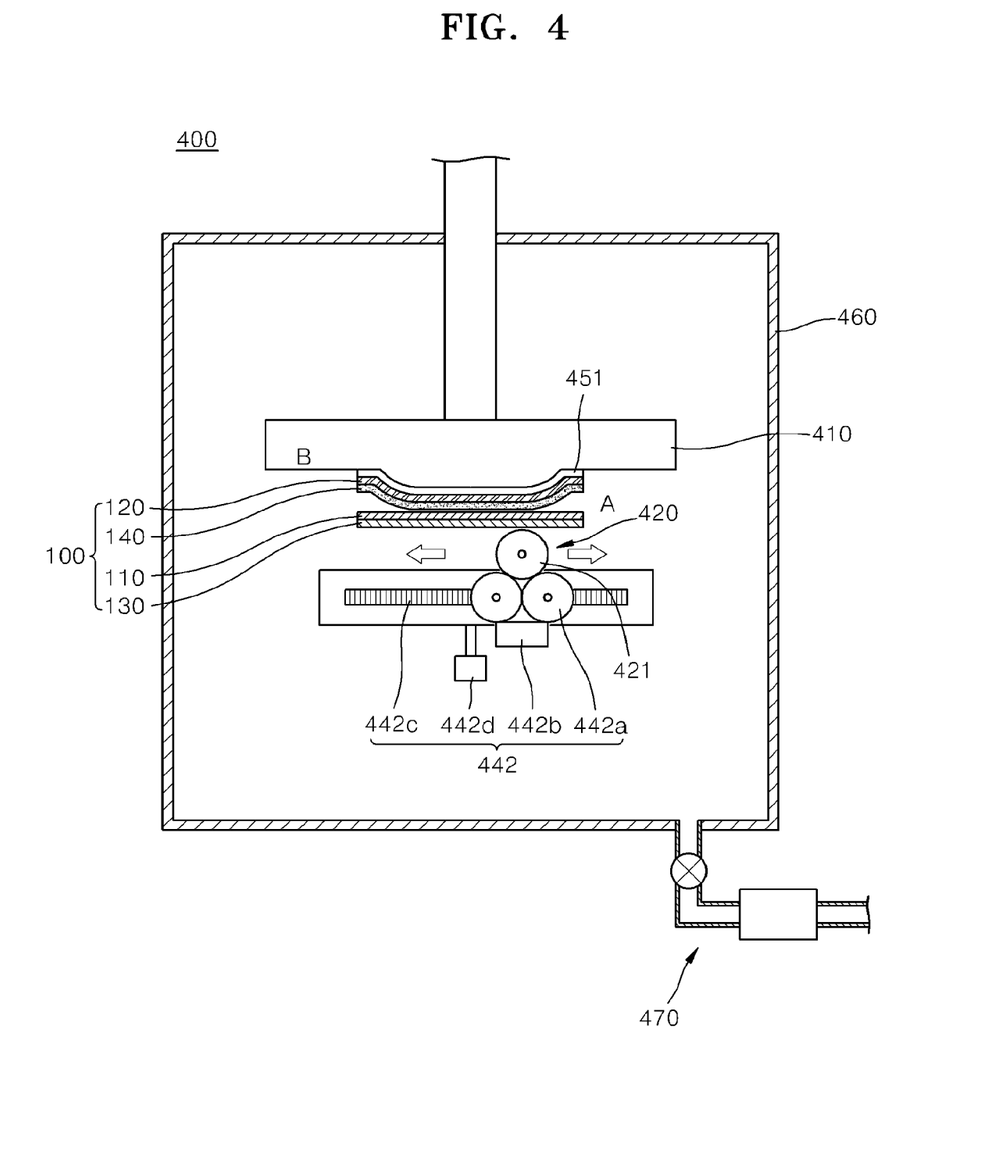
FIG. 4 is a cross-sectional view illustrating an apparatus for manufacturing the cover window illustrated in FIG. 1, according to one exemplary embodiment of the present invention.

FIG. 4 is a cross-sectional view illustrating an apparatus 400 for manufacturing the cover window 100 illustrated in FIG. 1, according to one exemplary embodiment of the present invention. Hereinafter, like reference numerals as described above denote like elements.

Referring to FIG. 4, the apparatus 400 for manufacturing a cover window may include a first moving unit 410, a second moving unit 420, a first fixing unit 451, a second driving unit 442, a chamber 460, and a pressure adjusting unit 470. The first moving unit 410, the first fixing unit 451, the chamber 460, and the pressure adjusting unit 470 are substantially the same as the first moving unit 210, the first fixing unit 251, the chamber 260, and the pressure adjusting unit 270 described with reference to FIGS. 1 and 2, and thus a detailed description thereof is omitted.

The second moving unit 420 may include a lamination roller 421 that contacts at least a portion of at least one of the film layer 110 and the protection layer 130 and linearly moves along the surface of at least one of the film layer 110 and the protection layer 130. The lamination roller 421 may laminate at least one of the film layer 110 and the protection layer 130 with the resin layer 120.

Also, the second driving unit 442 may linearly move the lamination roller 421. More specifically, the second driving unit 442 may include a first cylinder (not shown) that is connected to the lamination roller 421 and linearly moves the same in a first direction, a plurality of rollers 442a that contact the lamination roller 421 to rotate the same, and at least one first motor 442b and a first gear assembly 442c that are connected to the plurality of rollers 442a and rotate the plurality of rollers 442a while linearly moving the plurality of rollers 442a in the first direction. However, for ease of description, the description below will focus on an exemplary embodiment in which the second driving unit 442 includes a plurality of rollers 442a, a plurality of first motors 442b, and a first gear assembly 442c.

Also, the second driving unit 442 may include a second cylinder 442d that is connected to the lamination roller 421 and linearly moves the lamination roller 421 in a second direction that is different from the first direction. Also, the second driving unit 442 may include a second motor and a second gear assembly that are connected to the lamination roller 421 and linearly move the same in the second direction. The second driving unit 442 may include a forcing unit (not shown) that pushes the lamination roller 421 toward the first moving unit 410. More specifically, the forcing unit may include a material or an element such as an elastic material or a spring that provides a restorative force to the lamination roller 421. However, for ease of description, the description below will focus on an exemplary embodiment in which the second driving unit 442 includes the second cylinder 442d.

The first direction and the second direction may be at a predetermined angle with respect to each other. More specifically, the first direction may be a length direction or a width direction of the resin layer 120, and the first direction and the second direction may be perpendicular to each other.

In accordance with one exemplary embodiment using the apparatus 400 for manufacturing the cover window 100 as described above, the film layer 110 may be formed, and then the protection layer 130 may be formed on the film layer 110. The method of forming the protection layer 130 on the film layer 110 is substantially the same as described above, and thus a detailed description thereof is omitted. Also, as described above, the film layer 110 may contact the lamination roller 421 in a flat state or a bent state.

However, for ease of description, the description below will focus on an exemplary embodiment in which the film layer 110 contacts the lamination roller 421 in a flat state.

While the above-described operation is performed, the resin layer 120 may be formed and disposed on the first moving unit 210. The method of forming and disposing the resin layer 120 on the first moving unit 210 is substantially the same as described above, and thus a detailed description thereof is omitted. More specifically, when the resin layer 120 is disposed on the first moving unit 210, the adhesive layer 140 may be coated on the resin layer 120. The method of coating the adhesive layer 140 and the order of operations are the same as or similar to what was described above, and thus detailed descriptions thereof will be omitted.

When the resin layer 120 and the film layer 110 are disposed, the second cylinder 442d of the second driving unit 442 is operated to bring the lamination roller 421 into contact with the protection layer 130. When at least a portion of the film layer 110 and the adhesive layer 140 contact each other, the plurality of first motors 442b of the second driving unit 242 may linearly move the lamination roller 421.

More specifically, when at least a portion of the film layer 110 and the adhesive layer 140 contact each other, the lamination roller 421 may linearly move along the external surface of the film layer 110. More specifically, the lamination roller 421 may move from a portion where the adhesive layer 140 and the film layer 110 contact each other to a first end A of the resin layer 120 where the curvature radius of the bent portion of the resin layer 120 is the smallest. Also, after the lamination roller 421 has moved to the first end A of the resin layer 120, the lamination roller 421 may linearly move again along the surface of the protection layer 130 to a second end B of the resin layer 120 that is different from the first end A.

When the lamination roller 421 operates as described above, and the adhesive layer 140 and the film layer 110 start to contact each other, lamination work may be conducted as the lamination roller 421 linearly moves from the first end of the resin layer 120 to the second end of the resin layer 120. More specifically, in the above-described embodiment of the present invention, a portion of the adhesive layer 140 and a portion of the film layer 110 continuously and increasingly contact each other so as to effectively prevent bubbles from being generated between the adhesive layer 140 and the film layer 110. Moreover, when the chamber 460 is maintained in a vacuum by using the pressure adjusting unit 470, even fewer bubbles tend to be generated between the adhesive layer 140 and the film layer 110.

By using the apparatus 400 for manufacturing a cover window and the method of manufacturing a cover window, the film layer 110 and the resin layer 120 may be laminated quickly and easily. Moreover, fewer bubbles are generated during the lamination of the film layer 110 and the resin layer 120, thereby remarkably reducing defects in the manufactured cover window 100.

According to various exemplary embodiments of the present invention, a cover window may be manufactured by quickly and easily laminating the film layer and the resin layer. Also, according to various exemplary embodiments of the present invention, as a cover window is formed at room temperature, separation or deformation of the layers of the cover window can be prevented.

Moreover, according to various exemplary embodiments of the present invention, at least one portion of the cover window may be bent so as to provide a better viewing angle in various directions.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A cover window comprising:
a film layer comprising at least one bent portion;
a resin layer comprising at least one bent portion;
an adhesive layer disposed between the film layer and the resin layer and adhering to the film layer and the resin layer, where the adhesive layer comprises an optically clear adhesive; wherein the resin layer is at least one of polymethylmethacrylate (PMMA), polyethylene terephthalate (PET), polyethylene terephthalate glycol (PETG), or acrylonitrile butadiene styrene (ABS); and
a protection layer disposed on an opposing surface from a surface of the film layer that the adhesive layer contacts; where the protection layer comprises alternatively stacked organic materials and inorganic materials; where the organic material comprises an acrylic material;
wherein:
the film layer is at least one of polyethylene terephthalate (PET), polyethylene terephthalate glycol (PETG), or acrylonitrile butadiene styrene (ABS); and
the film layer, the adhesive layer, and the resin layer have different sizes in a bent direction of the at least one bent portion of both the film layer and the resin layer, and have corresponding edges that are aligned with one another in a straight line, the corresponding edges are arranged at ends of the cover window in the bent direction of the at least one bent portion of both the film layer and the resin layer.

2. The cover window of claim 1, wherein the film layer further comprises a flat portion extending from the at least one bent portion.

* * * * *